(12) United States Patent
Liou et al.

(10) Patent No.: US 9,184,975 B1
(45) Date of Patent: Nov. 10, 2015

(54) METHODS AND APPARATUS FOR WIDEBAND IMBALANCE COMPENSATION

(71) Applicant: The United States of America as represented by the Secretary of the Air Force, Washington, DC (US)

(72) Inventors: Lihyeh Liou, Centerville, OH (US); David M. Lin, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/548,320

(22) Filed: Nov. 20, 2014

(51) Int. Cl.
*H04L 27/01* (2006.01)
*H04L 27/38* (2006.01)
*H04L 25/03* (2006.01)

(52) U.S. Cl.
CPC ...... *H04L 27/3854* (2013.01); *H04L 25/03261* (2013.01)

(58) Field of Classification Search
USPC .............................. 375/346, 261; 455/296, 302
See application file for complete search history.

(56) References Cited

U.S. PATENT DOCUMENTS

| | | | | |
|---|---|---|---|---|
| 6,009,317 | A * | 12/1999 | Wynn | 455/296 |
| 7,555,051 | B2 * | 6/2009 | Zhang | 375/261 |
| 2004/0137869 | A1 * | 7/2004 | Kim | 455/324 |
| 2005/0070325 | A1 * | 3/2005 | Bellaouar et al. | 455/550.1 |
| 2011/0222638 | A1 * | 9/2011 | Park et al. | 375/346 |
| 2013/0023226 | A1 * | 1/2013 | Dai et al. | 455/302 |
| 2014/0323058 | A1 * | 10/2014 | Carbajal | 455/67.11 |

OTHER PUBLICATIONS

K. P. Pun, J. Franca and C. Azeredo-Leme, "Wideband Digital Correction of I and Q Mismatch in Quadrature Radio Receivers", IEEE ISCAS, V-661-664, 2000.
Tubbax, J., Come, B., Perre, L. Van Der, Deneire, L., Donnay, S., and Engels, M., "Compensation of IQ imbalance in OFDM Systems," Proc. IEEE Intl. Communications, May 2003, pp. 3403-3407.
M. Windisch, G. Fettweis, "Standard-Independent I/Q Imbalance Compensation in OFDM Direct-Conversion Receivers", Proc. 9th Intl. OFDM Workshop, 2004, pp. 57-61.

(Continued)

*Primary Examiner* — Eva Puente
(74) *Attorney, Agent, or Firm* — AFMCLO|JAZ; Jason Sopko

(57) ABSTRACT

An imbalance compensation system includes a receiver, a first path and a second path electrically coupled to the receiver, and a 90 degree hybrid coupler electrically connected to the second path, wherein the first path is configured to convey an in-phase (I) signal and the second path is configured to convey a quadrature phase (Q) signal. A processor is configured to perform Finite Impulse Response (FIR) filtering upon the I signal and the Q signal, wherein the processor is configured with an inverse matrix of coefficients corresponding to a frequency-dependent phase imbalance and a frequency-dependent amplitude imbalance between the I signal and the Q signal. The processor is configured to perform FIR filtering to attenuate an image signal down to a system noise floor when the processor simultaneously receives signals in a primary Nyquist region and a conjugate Nyquist region.

7 Claims, 8 Drawing Sheets

(56) References Cited

OTHER PUBLICATIONS

K-H Lin, H-L Lin, S-M Wang, and R. C. Chang, "Implemetation of Digital IQ Imbalance Compensation in OFDM WLAN Receivers", IEEE, ISCAS, pp. 3534-3537, 2006.

Y. Wang, Z. Chen, C. Van Meersbergen and S. Heinen, "System Simulation of adaptive I/Q Mismatch Compensation Method Using SystemC-AMS", Proc. 2010 Conference on Ph.D. Research in Microelectronics and Electronics (PRIME), Jul. 2010, pp. 1-4.

H. Cao, A. S. Tehrani, C. Fager, T. Eriksson and H. Zirath, "I/Q Imbalance Compensation Using a Nonlinear Modeling Approach", IEEE, Trans. on Microwave Theory and Techniques, vol. 57, No. 3, pp. 513-518, 2009.

* cited by examiner

METHODS AND APPARATUS FOR WIDEBAND IMBALANCE COMPENSATION

RIGHTS OF THE GOVERNMENT

The invention described herein may be manufactured and used by or for the Government of the United States for all governmental purposes without the payment of any royalty.

FIELD OF THE INVENTION

The present invention relates generally to signal processing and, more particularly, to wide bandwidth signal processing of arbitrary or unpredictable Radio Frequency (RF) signals.

BACKGROUND OF THE INVENTION

Hardware necessary to facilitate electronic signal intelligence gathering activity often includes a digital wideband receiver to detect multiple signals of unknown characteristics with a reasonable instantaneous dynamic range. In an effort to double the available bandwidth of a given system, other technology disciplines have implemented an in-phase/quadrature phase (I/Q) technique to extend the available sampling range beyond the primary Nyquist zone. Through this method, incoming signals are processed both in their native format, as well as in a 90° phase shifted format. By converting an input signal into both real and complex data, the available signal set may be extended to the conjugate Nyquist zone (from negative half of the sampling frequency to DC), thus doubling the bandwidth.

While the extended bandwidth realized by the I/Q technique is beneficial, operational problems have thus far prevented implementation in electronic signal intelligence gathering hardware. Unfortunately, variations in manufacturing tolerances in the quadrature phase shift hardware result in unavoidable imbalance in the I/Q channels. This produces an image signal, or alias signal (image and alias may be used interchangeably herein), in Fast Fourier Transform (FFT) analysis. As a consequence, the instantaneous dynamic range deteriorates.

Many of the techniques used to mitigate the effects of I/Q imbalance have been explored in signal processing disciplines wherein received signals are of a known frequency having well defined waveforms. The operational bandwidth is often narrow. As a result, many prior art techniques assume that the imbalance is frequency independent (since they are operating in a narrow band environment). However, electronic signal intelligence applications often include unknown frequencies or waveforms, and prior art imbalance compensation techniques are ineffective when imbalance correction is assumed to be frequency independent.

Further, prior art techniques that address frequency dependent mismatch issues, are incapable of applying mismatch correction when signals are simultaneously received in both Nyquist zones. In electronic signal intelligence scenarios, correction techniques must be capable of supporting simultaneous reception of signals in both Nyquist regions.

Therefore, there exists a need in the art for methods and apparatus to compensate for I/Q imbalances in wideband signal processing applications.

SUMMARY OF THE INVENTION

The present invention overcomes the foregoing problems and other shortcomings, drawbacks, and challenges of extending available bandwidth by use of I/Q techniques. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present an imbalance compensation system for in-phase quadrature phase RF systems is provided. The system includes a receiver, a first path and a second path electrically coupled to the receiver, and a 90 degree hybrid coupler electrically connected to the second path, wherein the first path is configured to convey an in-phase (I) signal and the second path is configured to convey a quadrature phase (Q) signal. A processor is configured to perform Finite Impulse Response (FIR) filtering upon the I signal and the Q signal, wherein the processor is configured with an inverse matrix of coefficients corresponding to a frequency-dependent phase imbalance and a frequency-dependent amplitude imbalance between the I signal and the Q signal. The processor is configured to perform FIR filtering to attenuate an image signal down to a system noise floor when the processor simultaneously receives signals in a primary Nyquist region and a conjugate Nyquist region.

According to another embodiment of the disclosed invention, a method for in-phase quadrature phase compensation is provided. The method includes receiving a first signal, and splitting the first signal into an in-phase (I) signal and a quadrature phase (Q) signal. The quadrature phase signals is obtained by using a 90 degree hybrid coupler. The method further includes determining a plurality of imbalance coefficients inherent to the 90 degree hybrid coupler by measuring the phase and amplitude differences between I and Q signals at a plurality of frequencies of interest. The method also includes configuring a Finite Impulse Response (FIR) filter adapted to the primary and conjugate Nyquist zones, with a matrix corresponding to the inverse of the plurality of imbalance coefficients. The method also includes processing the corresponding I and Q signals of the first signal as a complex value signal using the configured FIR filter. The first alias signal of the first signal is reduced to a noise floor.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
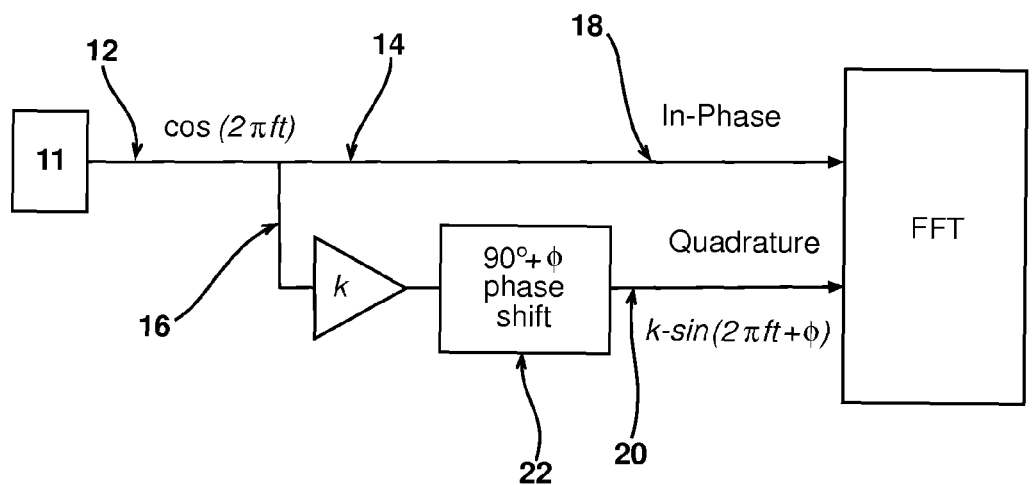
FIG. 1 is an illustration of in-phase/quadrature phase processing known to one of ordinary skill in the art.

A schematic I/Q based digital channel receiver is shown in FIG. 1. As shown, a receiver 11 acquires the incoming, real-valued signal 12, that is thereafter split into a first path 14 and a second path 16. The first path 14 is an in-phase (I) signal 18 and the second path 16 is a 90 degree shifted quadrature (Q) signal 20. This is achieved by using a 90 degree hybrid coupler 22. By shifting the phase of the second path 16, the real-valued signal is transformed into a complex signal (I-real-part, Q-imaginary part). When performing a Fast Fourier Transform (FFT) of a complex signal, the output does not produce a symmetrical frequency spectrum.

Figure 2:
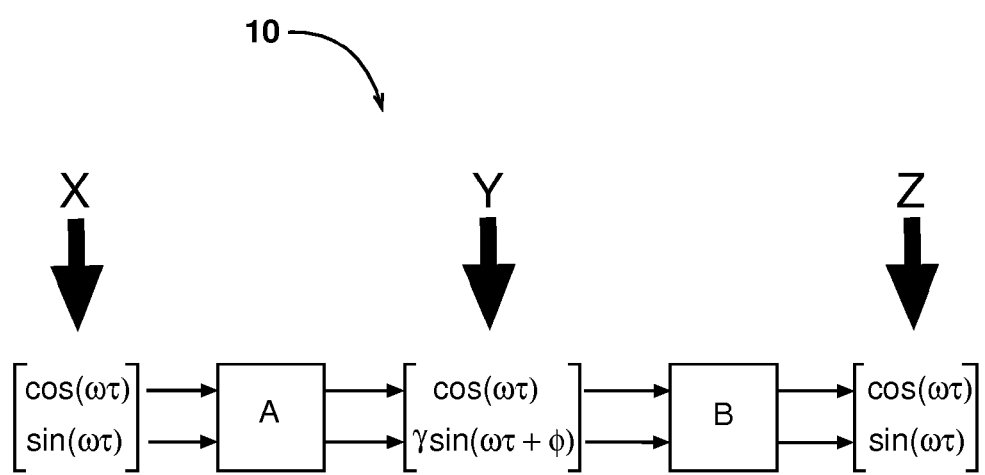
FIG. 2 is a block diagram illustration of the system and method of an embodiment of the disclosed imbalance mitigation system.

FIG. 2 is a schematic illustrating the I/Q imbalance effect, and correction thereof, according to an embodiment of the disclosed imbalance mitigation system 10. The input signal is X. After passing through the I/Q module, the output is Y. Because of the mismatch characteristics inherent to the 90 degree hybrid coupler, the time series of the two components are not exactly 90 degrees relative phase and they also do not have the same amplitude. Box A represents the transfer matrix of the 90 degree hybrid coupler 22 (defining the imbalance introduced by the 90 degree hybrid coupler). According to an embodiment of the disclosed invention, let the input signal be Y, and the output signal (the attempted reconstruction of X, after a large portion of the imbalance is removed by the filtering of the disclosed invention) is Z. The transfer matrix of the imbalance correction according to the disclosed invention is B. In some embodiments of the disclosed invention, the B matrix is the inverse of A. The matrix A and B may be derived to be:

$$A = \begin{bmatrix} A_{11} & A_{12} \\ A_{21} & A_{22} \end{bmatrix}, \quad \text{Equation (1)}$$

$$A_{11} = 1; A_{12} = 0; A_{21} = \gamma\sin(\phi); A_{22} = \gamma\cos(\phi).$$

and $$B = \begin{bmatrix} B_{11} & B_{12} \\ B_{21} & B_{22} \end{bmatrix}, \quad \text{Equation (2)}$$

$$B_{11} = 1; B_{12} = 0; B_{21} = -\tan(\phi); B_{22} = 1/[\gamma\cos(\phi)].$$

wherein $\gamma$ and $\phi$ are amplitude and phase mismatches, respectively, at frequency f.

Let $Z_{in}$ and $Z_{out}$ be the input and output signals, respectively, and they are related in the following expression:

$$Z_{out} = CZ_{in} + DZ^*_{in} \quad \text{Equation (3)}$$

wherein $Z^*_{in}$ is the conjugate of $Z_{in}$, and C and D are given by:

$$C = (B_{11} - jB_{12} + jB_{21} + B_{22})/2 \quad \text{Equation (4)}$$

$$D = (B_{11} + jB_{12} + jB_{21} - B_{22})/2 \quad \text{Equation (5)}$$

where $B_{11}$, $B_{12}$, $B_{21}$, and $B_{22}$ are defined in Equation (2). These parameters depend on the 90 degree hybrid's 22 phase and amplitude mismatches at frequency f. It is noted that Equation (3) is based on the assumption of a quasi-linear model.

Figure 3:
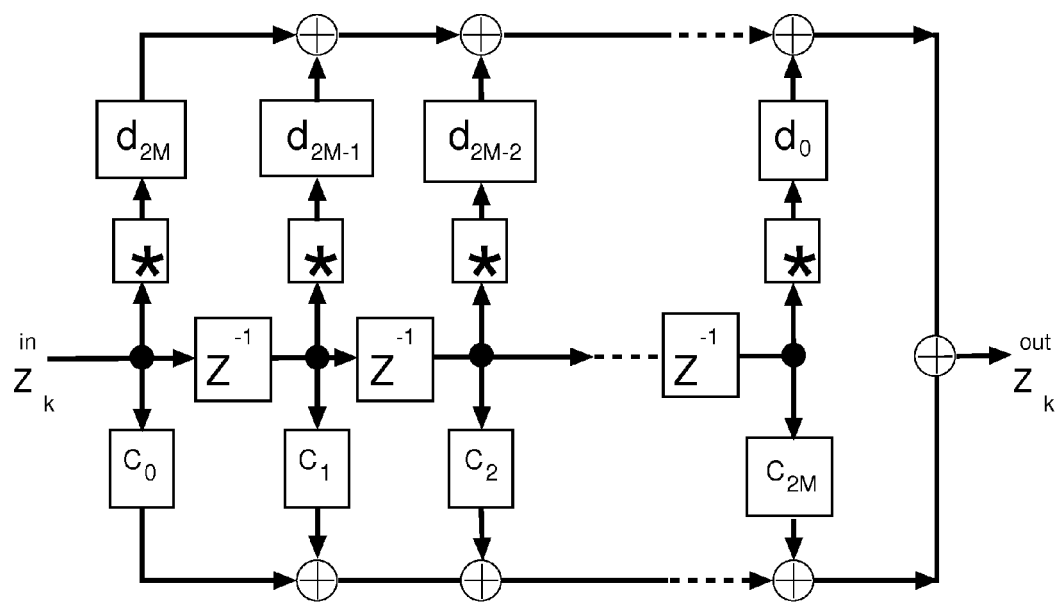
FIG. 3 is a flowchart illustrating in input and output structure in accordance with an embodiment of the disclosed invention.

The input and output relationships of the imbalance mitigation system 10 in the time-domain can be written as a combination of two sets of Finite Impulse Response (FIR) filters as shown in Equation (6):

$$z_{out,k} = \sum_{m=-M}^{M} c_m z_{in,k-m} + \sum_{m=-M}^{M} d_m z^*_{in,k+m} \quad \text{Equation (6)}$$

wherein the series of c and d are Fourier pairs of C and D, in Equations (4) and (5), respectively. It should be noted that there are (2M+1) tap number in the FIR filter. The second set has a positive time index in the summation instead of a negative index as seen in the first set. This results from the conjugated input as shown in Equation (3). By rearranging the index in Equation (6), i.e., "−M to M" to "0 to (2M)", a schematic of Equation (6) is shown in FIG. 3.

There are several techniques to implement Equation (6) in computation hardware, such as an FPGA, for real time signal processing. Generally, any processor having memory may be used to execute the imbalance compensation. By way of example, an application specific integrated circuit or general purpose microprocessor may be used. Regardless of the type of hardware selected, it will be appreciated by one of ordinary skill in the art that sufficient memory (preferably non-volatile), must be reserved to retain the inverse matrix of 90 degree hybrid-specific variables. One method involves converting the complex parameters of c's and d's, and the input time series data, into real and imaginary parts and to match the real and imaginary parts in both sides of Equation (6). In so doing, the real and imaginary parts of the output signal will each has four sets of FIR filter. Each set can be implemented in FPGA using a polyphase method.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 4:
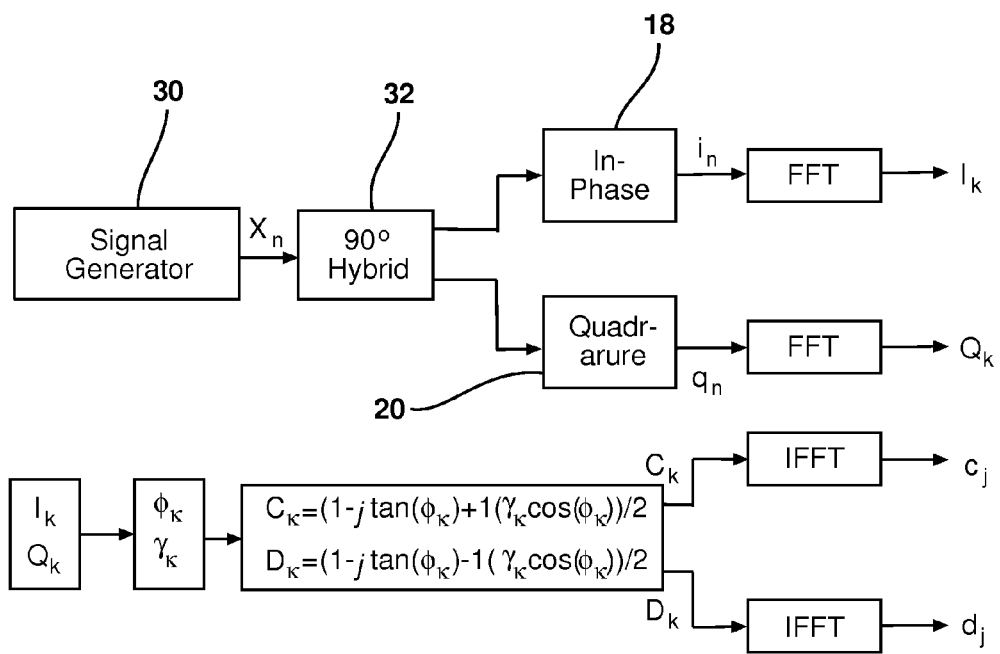
FIG. 4 is a flowchart illustrating a test of the method and system according to an embodiment of the disclosed invention.
Figure 5:
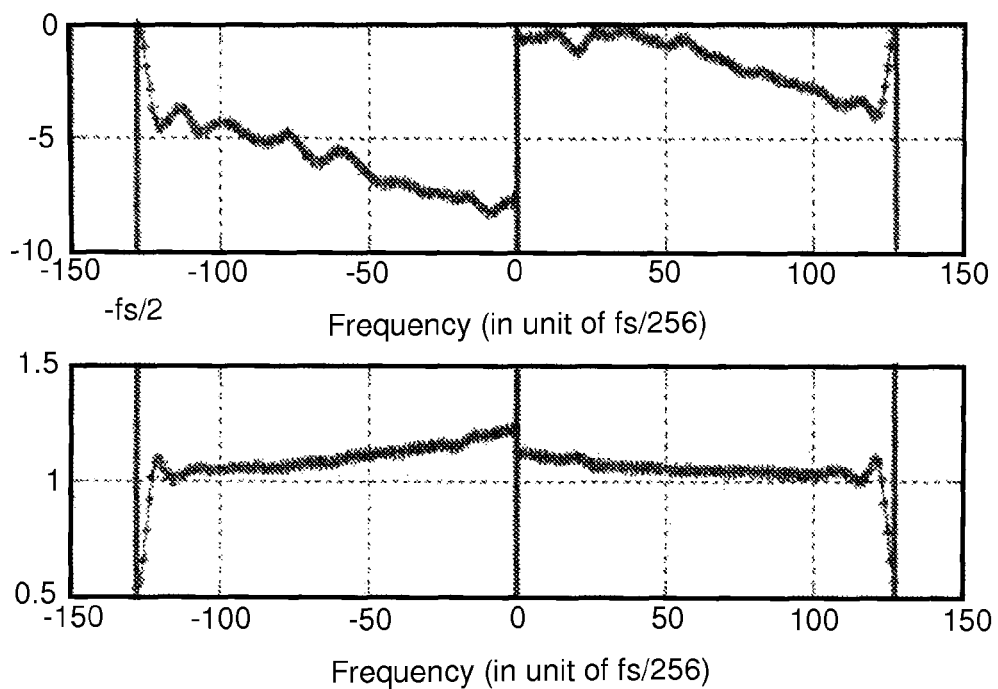
FIG. 5 is a graphical representation of the amplitude and phase imbalance imparted by the hardware used in the test of the disclosed invention.

FIG. 4 shows a schematic experimental setup to characterize frequency-dependent I/Q module imbalance parameters of the system 10. A signal from a signal generator 30 is fed into an analog I/Q hybrid 32 (including a 90 degree hybrid 22 and a pass through for the in-phase signal 18). The I/Q hybrid 32 output is connected to a digital oscilloscope in which digital data are collected. In this demonstration, the I/Q hybrid 32 has a valid frequency range from 0.8 to 2 GHz and the ADC's sampling frequency is 1 GHz. The input frequency of interest is chosen to be from 1 GHz to 2 GHz. The phase difference and amplitude ratio are calibrated using Fourier analysis in the frequency range of interest with a 20 MHz step-size. Using the Spline function of Matlab®, these data are then converted to imbalance data at a set of 256 frequency points with a constant interval in the frequency range of interest (i.e., between 1 and 2 GHz). The converted mismatch parameters' spectra in the base band are shown in FIG. 5.

Figure 6:
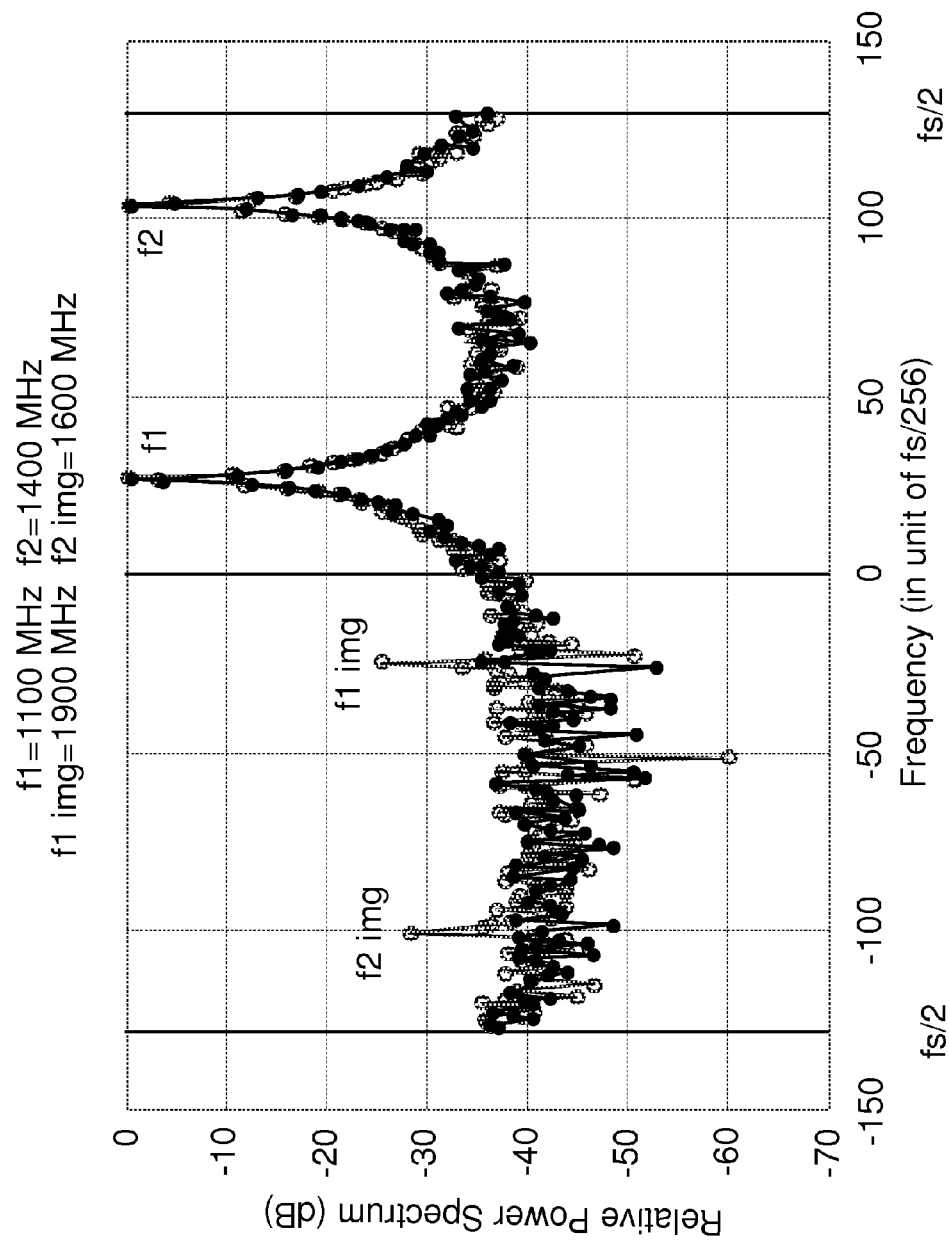
FIG. 6 is a graphical comparison of two signals before and after imbalance mitigation in accordance with an embodiment of the disclosed invention, wherein each signal is from the primary Nyquist zone.
Figure 7:
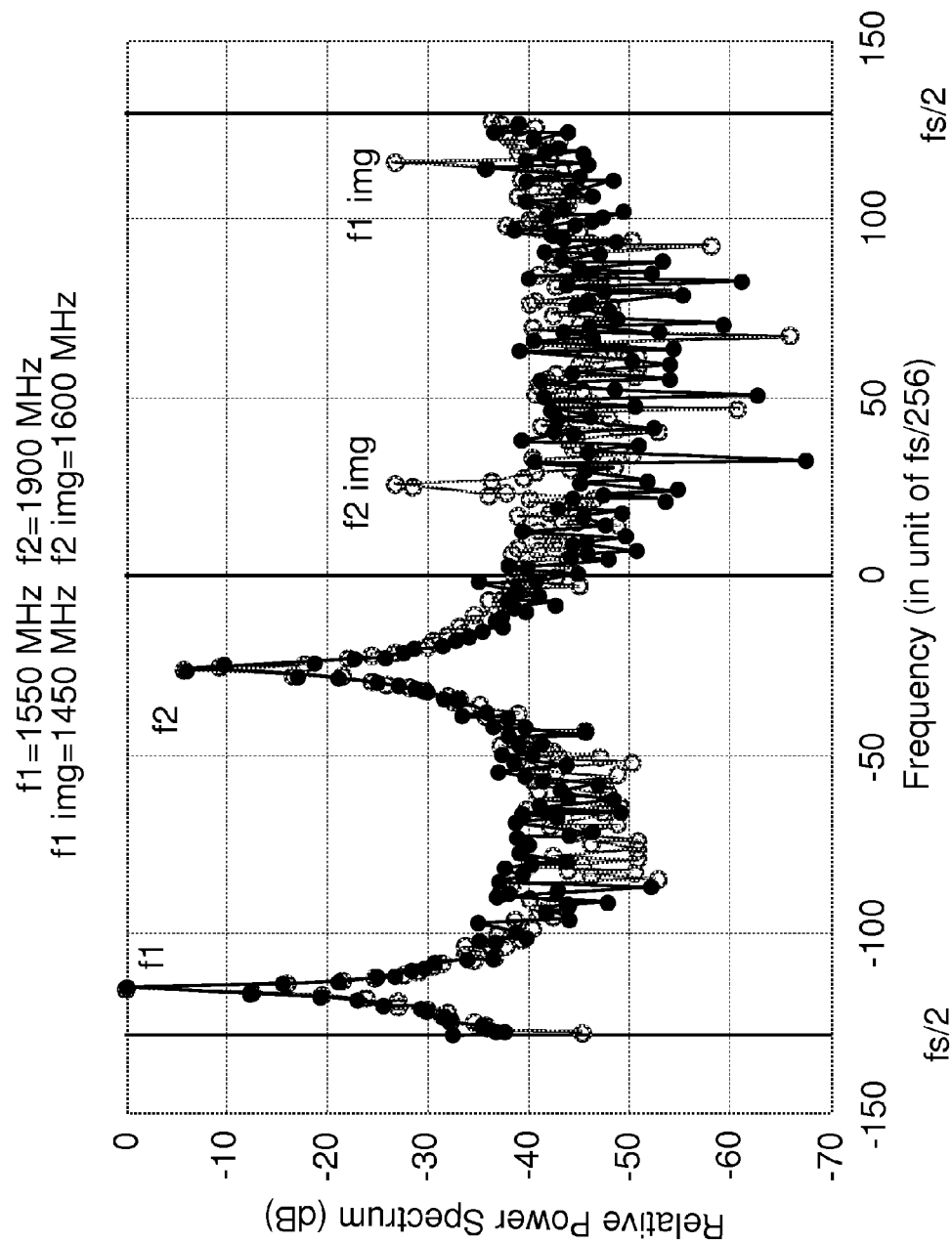
FIG. 7 is a graphical comparison of two signals before and after imbalance mitigation in accordance with an embodiment of the disclosed invention, wherein each signal is from the conjugate Nyquist zone.
Figure 8:
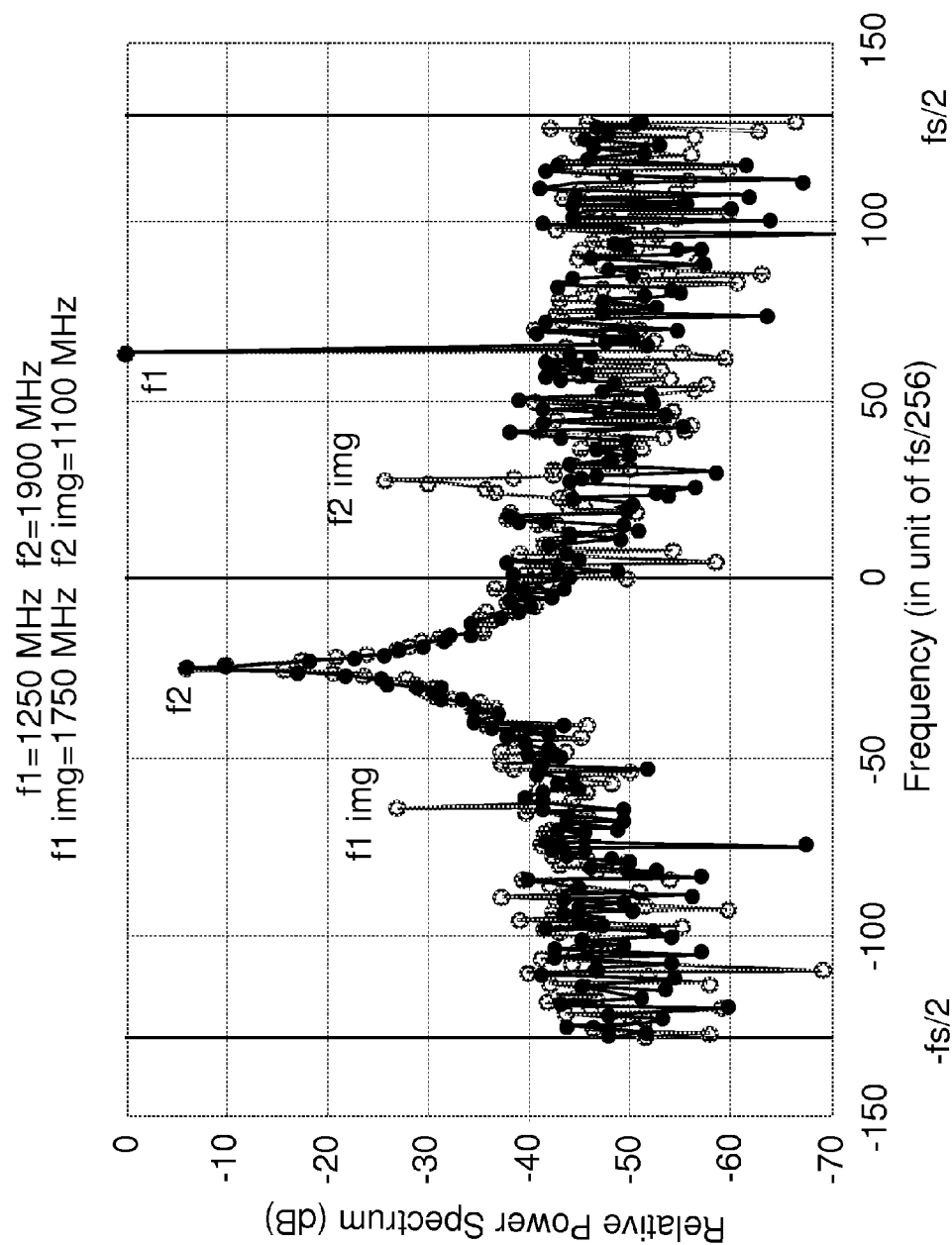
FIG. 8 is a graphical comparison of two signals before and after imbalance mitigation in accordance with an embodiment of the disclosed invention, wherein one signal is from the primary Nyquist zone and the other signal is from the conjugate Nyquist zone.

Based on the measured mismatch spectra, the imbalance mitigation system coefficients are determined following the process in the bottom half of FIG. 4. To test the resulting FIR filter, two signals are generated simultaneously in various configurations (as will be explained in detail below). Three testing cases are generated based on signals' Nyquist zones and the results are shown in FIGS. 6, 7 and 8. FIG. 6 shows the results for the case wherein both input signals are from primary Nyquist zone. FIG. 7 shows the results for the case wherein both input signals are from conjugated Nyquist zone. FIG. 8 shows the results for the case that one of the input signals is from primary Nyquist zone and another from conjugate Nyquist zone. As shown in these plots, the imaginary power before mitigation is about −25 dB. After the mitigation, the image power is reduced to the noise level, lower than −40 dB. It should be noted that the resultant suppression applies to all three cases of simultaneous signal reception. Notably, unlike prior art I/Q imbalance methods, the disclosed invention achieves acceptable performance during simultaneous reception of unknown or arbitrary signals in both the primary and conjugate Nyquist regions.

It should be noted that the disclosed invention contains two sets of FIR filters (see Equation 6), and the design of the FIR coefficients in both sets. One set of FIR filters is configured to perform imbalance mitigation when the multiple input signals are from the primary Nyquist zone, while the other is configured to perform imbalance mitigation when the multiple input signals are from the conjugate Nyquist zone. The FIR coefficients in both sets are computed from the imbalance calibration (see FIG. 4) of the I/Q hybrid coupler, thus covering both the primary and conjugate Nyquist zones. By linearly combining these two sets, the disclosed invention provides imbalance mitigation regardless of whether the multiple input signals are from same or different Nyquist zones. As a result, this invention expands the application bandwidth of the I/Q receiver by two fold. Prior art methods only function properly when the multiple input signals are in only one Nyquist zone (either primary or conjugate Nyquist zone, but not simultaneously in both), and thus cannot claim to broaden application bandwidth by two folds.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An imbalance compensation system for in-phase quadrature phase RF systems, the system comprising:
    a receiver;
    a first path and a second path electrically coupled to the receiver;
    a 90 degree hybrid coupler electrically connected to the second path, wherein the first path is configured to convey an in-phase (I) signal and the second path is configured to convey a quadrature phase (Q) signal;
    a processor configured to perform Finite Impulse Response (FIR) filtering upon the I signal and the quadrature (Q) signal, wherein the processor is configured with an inverse matrix of coefficients corresponding to a frequency-dependent phase imbalance and a frequency-dependent amplitude imbalance between the I signal and the Q signal; and
    wherein the processor is configured to perform FIR filtering to attenuate an image signal down to a system noise floor when the processor simultaneously receives signals in a primary Nyquist region and a conjugate Nyquist region.

2. The system of claim 1, wherein the inverse matrix of coefficients corresponding to the frequency dependent phase imbalance and the frequency dependent amplitude imbalance is obtained by the following equations:
    let A represent the transfer matrix of the 90 degree hybrid coupler, and let B represent a transfer matrix of the imbalance correction $$A = \begin{bmatrix} A_{11} & A_{12} \\ A_{21} & A_{22} \end{bmatrix},$$

$$A_{11} = 1; A_{12} = 0; A_{21} = \gamma\sin(\phi); A_{22} = \gamma\cos(\phi)$$

$$B = \begin{bmatrix} B_{11} & B_{12} \\ B_{21} & B_{22} \end{bmatrix},$$

$$B_{11} = 1; B_{12} = 0; B_{21} = -\tan(\phi); B_{22} = 1/[\gamma\cos(\phi)]$$

wherein $\gamma$ and $\phi$ are amplitude and phase mismatches, respectively, at frequency f;
    let $Z_{in}$ and $Z_{out}$ be the input and output signals in a frequency domain, respectively, related by $$Z_{out} = CZ_{in} + DZ^*_{in}$$

wherein $Z^*_{in}$ is the conjugate of $Z_{in}$, and C and D are given by:

$$C = (B_{11} - jB_{12} + jB_{21} + B_{22})/2$$

$$D = (B_{11} + jB_{12} + jB_{21} - B_{22})/2;$$

and
    wherein C and D are frequency dependent, and a plurality of C and D are calculated from the frequency dependent phase imbalance and the frequency dependent amplitude imbalance between the I signal and the Q signal at a plurality of frequencies.

3. The system of claim 2, wherein the processor performs FIR filtering to attenuate an image signal down to a system noise floor when the processor simultaneously receives signals in the primary Nyquist region and the conjugate Nyquist region by implementing the following filtering equations:

$$z_{out,k} = \sum_{m=-M}^{M} c_m z_{in,k-m} + \sum_{m=-M}^{M} d_m z^*_{in,k+m}$$

wherein the series of c and d are computed from the inverse Fourier transform of the series of C and D, respectively, wherein the series of C and D are computed from the frequency dependent phase imbalance and the frequency dependent amplitude imbalance between the I signal and the Q signal, and wherein c and d are Fourier pairs of C and D, respectively.

4. A method for in-phase quadrature phase compensation, the method comprising:
receiving a first signal;
splitting the first signal into an in-phase (I) signal and a quadrature phase (Q) signal, wherein the quadrature phase signals is obtained by using a 90 degree hybrid coupler;
determining a plurality of imbalance coefficients inherent to the 90 degree hybrid coupler by measuring a phase and an amplitude differences between I and Q signals at a plurality of frequencies of interest;
configuring a Finite Impulse Response (FIR) filter adapted to a primary and conjugate Nyquist region, with a matrix corresponding to the inverse of the plurality of imbalance coefficients;
processing the I and Q signals of the first signal as a complex value signal using the configured FIR filter; and
wherein a first alias signal of the first signal is reduced to a noise floor.

5. The method of claim 4, wherein a second signal is received simultaneously with the first signal, wherein one of the first signal and the second signal is from a primary Nyquist region, and the other of the first signal and the second signal is from a conjugate Nyquist region, and wherein the first alias signal and a second alias signal are simultaneously reduced to the noise floor.

6. The method of claim 5, wherein the inverse matrix of coefficients corresponding to a frequency dependent phase imbalance and a frequency dependent amplitude imbalance is obtained by the following equations:
let A represent the transfer matrix of the 90 degree hybrid coupler, and let B represent a transfer matrix of the imbalance correction $$A = \begin{bmatrix} A_{11} & A_{12} \\ A_{21} & A_{22} \end{bmatrix},$$

$A_{11} = 1; A_{12} = 0; A_{21} = \gamma\sin(\phi); A_{22} = \gamma\cos(\phi)$ $$B = \begin{bmatrix} B_{11} & B_{12} \\ B_{21} & B_{22} \end{bmatrix},$$

$B_{11} = 1; B_{12} = 0; B_{21} = -\tan(\phi); B_{22} = 1/[\gamma\cos(\phi)]$ wherein $\gamma$ and $\phi$ are amplitude and phase mismatches, respectively, at frequency f;
let $Z_{in}$ and $Z_{out}$ be the input and output signals in a frequency domain, respectively, related by $Z_{out} = CZ_{in} + DZ^*_{in}$ wherein $Z^*_{in}$ is the conjugate of $Z_{in}$, and C and D are given by:

$C = (B_{11} - jB_{12} + jB_{21} + B_{22})/2$ $D = (B_{11} + jB_{12} + jB_{21} - B_{22})/2;$ and
wherein C and D are frequency dependent, and a plurality of C and D are calculated from the frequency dependent phase imbalance and the frequency dependent amplitude imbalance between the I signal and the Q signal at a plurality of frequencies.

7. The method of claim 6, wherein the processing of the I and Q signals of the first signal as a complex value signal, is performed by the FIR filter configured with the following terms:

$$z_{out,k} = \sum_{m=-M}^{M} c_m z_{in,k-m} + \sum_{m=-M}^{M} d_m z^*_{in,k+m}$$

wherein the series of c and d are computed from the inverse Fourier transform of the series of C and D, respectively, wherein the series of C and D are computed from the frequency dependent phase imbalance and the frequency dependent amplitude imbalance between the I signal and the Q signal, and wherein c and d are Fourier pairs of C and D, respectively.

* * * * *